UNITED STATES PATENT OFFICE.

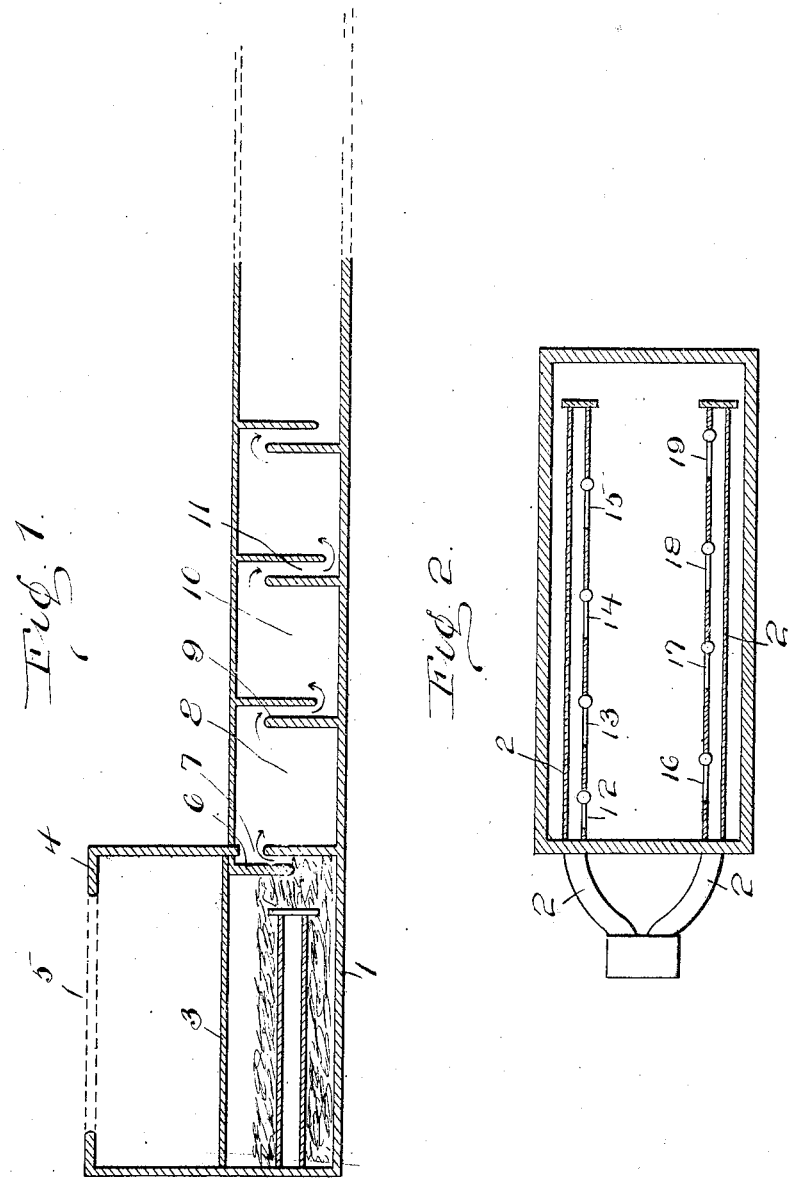

JOHN WILLIAM KEEGAN, OF SANTA ROSA, CALIFORNIA.

SEWAGE-DISPOSAL APPARATUS.

No. 836,386.  Specification of Letters Patent.  Patented Nov. 20, 1906.

Application filed August 5, 1905. Serial No. 272,925.

*To all whom it may concern:*

Be it known that I, JOHN WILLIAM KEEGAN, a citizen of the United States, and a resident of the city of Santa Rosa, county of Sonoma, State of California, have invented certain new and useful Improvements in Sewage-Disposal Apparatus, of which the following is a specification.

My invention relates to the art of sewage disposal, and especially to the apparatus employed in processes of sewage disposal by the action of anærobic bacteria, and has for its object to provide apparatus for effectually purifying sewage-sludge by subjecting it to a series of anærobic bacterial actions, the said series being continued until the dead organic matter and the anærobic bacteria have all disappeared.

I accomplish my object by means illustrated in the accompanying drawings, of which—

Figure 1 is a diagrammatic view of my series of anærobic bacterial-beds; Fig. 2, a top view of Fig. 1 with cover removed, showing means of shifting the point of introduction of the sewage into the initial-bacterial bed.

Similar numerals of reference refer to similar parts in both views.

When sewage is subjected to anærobic bacterial action in suitable bacterial-bed, being allowed to slowly flow therethrough, the effluent from said bed is found to contain dead organic matter and anærobic bacteria, but both the dead organic matter and anærobic bacteria exist therein in diminished quantities, and the decrease of dead organic matter and the decrease of anærobic bacteria take place in practically the same proportion. If the effluent from such a tank or bed be subjected to a second anærobic action in a separate bed, the inflowing sewage having been diminished in both dead organic matter and anærobic bacteria in the first bed, will be further depleted of its organic and bacterial contents, and its effluent, similarly depleted, will be further acted on in the same way in a third bed, and so on, until the dead organic matter and the anærobic bacteria have all disappeared.

I provide an initial bacterial bed 1, into which the sewage passes after leaving the grit-chamber (which, forming no part of my invention, is not shown) through pipe 2. Bacterial bed 1 is provided with a subpermanent cover 3, which remains thereon until a scum of suitable thickness forms on the surface of the sewage in said bed. The purpose of said cover is to allow an undisturbed bacterial scum to form by excluding the air. When such scum has been formed, the cover 3 is removed and is thereafter disused. I provide a roof 4 over my bacterial-bed having a screened opening 5 to allow the escape of gases formed by the anærobic bacterial action and to provide for the oxidation of the scum at its top surface.

Pipes 2 are provided with valved parts along their length, which may be operated by an attendant from outside the bed. These parts are arranged for the purpose of shifting the point of introduction of the sewage into the bed. I provide a scum-retarding board 6 before the exit-aperture 7 of tank, the purpose of which is to prevent the light scum from flowing with the fluid effluent of bed 1 through said aperture. I provide a second bed 8, connected with the initial bed 1 through aperture 7, which receives the effluent from said initial bed, which, having been subjected to anærobic bacterial action in bed 1, comes to bed 8 with a diminished quantity of dead organic matter and of anærobic bacteria. The flow through bed 8 is retarded by dam 9, which retardation causes a deposit of dead organic matter and therefore a diminution in the quantity of dead organic matter which flows through dam 9 into a third bacterial-bed 10, where it is similarly retarded in its flow by dam 11, with the like effect of causing deposition of dead organic matter. I provide a succession of such beds, as shown in Figs. 1 and 2, of sufficient number to cause the deposition of all the dead organic matter originally contained in the sewage.

It is a physical fact, as aforesaid, that along with this gradual decrease of dead organic matter there goes a gradual decrease of the anærobic bacteria, and therefore when a series of such beds are provided of sufficient capacity to free the flowing sewage of dead organic matter the anærobic bacteria also disappear, leaving an effluent composed of water containing various gases.

The essential features of my invention are those described above. While the effluent from the last bacterial-bed is subjected to any suitable oxidizing process adapted to eliminate its contained gases, as by spraying in the open air, the object of my invention—to wit, to free the sewage of dead organic matter by the action of anærobic bacteria, and the elimination of said bacteria—is accomplished by the means described. The operation is anærobic in its character throughout.

Referring now to Fig. 2, I provide means of shifting the point of introduction of the sewage into the initial bed. When sewage is introduced into the bed 1 at any point, there is introduced along with it a quantity of oxygen; but the presence of oxygen arrests the action of anærobic bacteria; putrefaction and clogging arise at the point of introduction. This defective action is manifested by the scum directly over this point, which becomes thickened and piles up. I therefore provide openings 12, 13, 14, 15, 16, 17, 18, and 19, Fig. 2, in pipes 2, having valves or gates which are manipulated from outside said bed. The operation of such means is as follows: All the gates are closed, excepting one; say 12. When the scum over gate 12 shows by its piling up that the bacterial action about this point of introduction is becoming arrested and that clogging is taking place, gate 12 is closed and a gate at some distant point is opened, as at 17. This arrested action takes place after some weeks, sometimes months, according to the character of the sewage introduced and its comparative freedom from oxygen. Gate 17 remains open until the scum directly over it discloses in a similar manner the like defective activity, whereupon gate 17 is closed and another gate opened. Closing the gates causes the normal process of anærobic bacterial action to be resumed at the defective points.

In practice the series of anærobic bacterial-beds herein described are arranged on a slightly-inclined grade. Where the natural conditions favor, they may be constructed by excavating the earth in suitable shapes, using the ground itself for walls or lining with concrete, or the construction may be of suitable materials wholly or partially above ground.

Having described my invention, what I claim as new, and desire to secure by Letters Patent of the United States, is—

1. In sewage-disposal apparatus having a series of communicating bacterial-beds, an initial bacterial-bed having means of shifting periodically the position of the region of defective anærobic activity therein.

2. In sewage-disposal apparatus, an initial anærobic bacterial-bed having means of shifting the position of the region of defective anærobic activity therein periodically, in combination with a series of communicating anærobic bacterial-beds of sufficient number to substantially eliminate all anærobic bacteria.

In testimony whereof I have hereunto signed my name in the presence of two witnesses.

JOHN WILLIAM KEEGAN.

Witnesses:
  FINLAY COOK,
  W. H. MEAD.